(12) United States Patent
Chen et al.

(10) Patent No.: US 10,860,845 B2
(45) Date of Patent: Dec. 8, 2020

(54) METHOD AND SYSTEM FOR AUTOMATIC REPETITIVE STEP AND CYCLE DETECTION FOR MANUAL ASSEMBLY LINE OPERATIONS

(71) Applicant: Robert Bosch GmbH, Stuttgart (DE)

(72) Inventors: Yen-Lin Chen, San Jose, CA (US); Lincan Zou, San Jose, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 16/166,780

(22) Filed: Oct. 22, 2018

(65) Prior Publication Data

US 2020/0125839 A1   Apr. 23, 2020

(51) Int. Cl.
*G06K 9/00* (2006.01)
*G06F 3/01* (2006.01)
*G06T 7/20* (2017.01)

(52) U.S. Cl.
CPC ......... *G06K 9/00355* (2013.01); *G06F 3/014* (2013.01); *G06T 7/20* (2013.01); *G06T 2207/10016* (2013.01); *G06T 2207/30196* (2013.01)

(58) Field of Classification Search
CPC .............................. G06K 9/00355; G06F 3/014
See application file for complete search history.

(56) References Cited

U.S. PATENT DOCUMENTS

| 2009/0251553 | A1* | 10/2009 | Cambell ............... G06F 3/0485 348/211.99 |
| 2012/0143358 | A1* | 6/2012 | Adams ............... G06K 9/00342 700/92 |
| 2012/0159290 | A1* | 6/2012 | Pulsipher ................. G06K 9/38 714/819 |

(Continued)

OTHER PUBLICATIONS

Muller, et al., "Motion tracking applied in assembly for worker training in different locations", 23rd CIRP Conference on Life Cycle Engineering, Elsevier B.V., Procedia CIRP 48 (2016) pp. 460-465 (doi:10.1016/j.procir.2016.04.117.

*Primary Examiner* — Md K Talukder
(74) *Attorney, Agent, or Firm* — Maginot, Moore & Beck LLP

(57) ABSTRACT

A system for determining a quantitative accuracy of a test movement relative to a reference movement includes a display output device, a memory, and a processor operatively connected to the display output device and the memory. The memory stores motion capture data and programming instructions. The processor executes the programming instructions to determine a quantitative accuracy of the test movement relative to the reference movement. A method, executable by the processor, for determining the quantitative accuracy includes receiving, with the processor, motion capture data that includes the reference movement and the test movement. The motion data is split into individual movements, and the test movement is aligned with the reference movement. The processor computes a quantitative accuracy of the test movement relative to the reference (Continued)

movement, and generates, with the display output device, a visualization representative of the test movement. The computed accuracy is encoded into the visualization.

14 Claims, 11 Drawing Sheets

(56) References Cited

U.S. PATENT DOCUMENTS

| | | | |
|---|---|---|---|
| 2013/0076616 A1* | 3/2013 | Csaszar | G09G 5/00 345/156 |
| 2013/0278501 A1* | 10/2013 | Bulzacki | G06F 3/0304 345/157 |
| 2017/0103672 A1* | 4/2017 | Dey | G06F 3/0304 |
| 2017/0266491 A1* | 9/2017 | Rissanen | G09B 19/003 |
| 2020/0058148 A1* | 2/2020 | Blaylock | G06T 7/248 |
| 2020/0125839 A1* | 4/2020 | Chen | G06Q 10/0633 |

* cited by examiner

METHOD AND SYSTEM FOR AUTOMATIC REPETITIVE STEP AND CYCLE DETECTION FOR MANUAL ASSEMBLY LINE OPERATIONS

TECHNICAL FIELD

This disclosure relates generally to human motion sensing, and, more particularly, to automatic analysis of human motion for a defined procedure.

BACKGROUND

Unless otherwise indicated herein, the materials described in this section are not prior art to the claims in this application and are not admitted to the prior art by inclusion in this section.

Aspects of human movement can have a large impact on, for example, the way a tool is designed, the way a workspace is laid out, or the way a task is performed. Understanding how the human body can move and interact with objects and the environment can result in tools that are more ergonomic, workspaces that are more efficient to navigate, and tasks that more intuitive to perform. The range of possible human motions and gestures is vast, however, and simple tasks, such as lifting a cup, pointing in a direction, or turning a screw, often result from a complex set of biomechanical interactions. This relation of simple result from complex movement can make human motions and gestures extremely difficult to quantify or understand in a meaningful or practical way.

As used herein, a "movement" includes one or more of a "motion," i.e. a relative change in the position of a body part, and a "gesture," i.e. a relative change in the orientation of a body part. Due to the complex nature of biomechanical interactions underneath even simple actions, human movements are commonly evaluated based on outcome, rather than analysis of the movements themselves. For example, it is generally much easier to evaluate a ball thrown by a pitcher, a painting made by an artist, etc. than it is to evaluate the movements executed to arrive at those outcomes. However, considering outcomes can have a limited utility in training others to perform the underlying movements accurately.

For example, manual and even semi-automatic assembly lines rely on workers accurately performing complex sequences of movements in order to maintain assembly quality and productivity levels. To be accurate, actions in a sequence must be performed in a correct order, within a defined time period, and with correct motions and gestures. While considering whether the outcome of the sequence is accurate or not can be simply accomplished by considering whether the assembly is completed without defect within the defined time period, computing whether the motions and gestures were optimal, or identifying when and how an assembly deviated from the prescribed sequence, for example, can be much more difficult to ascertain.

Technologies have been developed to assist with automatically identifying human movements. For example, motion capture technology and computer vision have been used to generate three-dimensional models usable to identify a pose or position, and to detect changes in pose or position to identify a motion or gesture. However, merely identifying a particular motion or gesture has a limited utility for quantitatively computing accuracy.

In an example, a smart assembly workplace provides computer-supported instruction for training workers to perform an assembly sequence. Prior to training, an experienced worker performs the movements required by the assembly sequence, and inputs data including images of the each step of the assembly. The experienced worker then identifies the assembly steps associated with the data to define actions to be taken and locations for the worker's hands during each step, and a target time for the completion of that step. Unexperienced workers using the workplace can be guided through the assembly sequence based on the actions identified for each of the steps, can be notified if their hands are in the wrong position during a step, and can be evaluated by comparing their execution times compared to the target times for the sequence.

However, recording the position of the experienced workers hands at each step is an observation of the result of a motion or gesture, rather than of the motion or gesture itself. In other words, identifying that an unexperienced worker's hand is in the wrong position does not reveal when or how the worker's hand deviated from the movement executed to reach that position or provide guidance as to the correct movement. Identification of an inaccurate position is indicative of an inaccurate motion or gesture, but does not quantitatively evaluate when and how the motion or gesture deviated, and thus has limited utility in correcting the deviated movement.

Thus, a system that can quantify the accuracy of human movements would be beneficial. A system that does not require extensive training data collection and that is usable when reference data is extremely limited, or when the movements are difficult to describe or preform would also be beneficial. A system that provides guidance for correcting a deviated movement would also be beneficial. A system that enables the comparison of movements with multiple steps, and a system that is able to relate step information in reference data to test data would also be beneficial.

SUMMARY

In order to determine how a test movement deviates from a reference movement, how to correct the test movement, and/or how a deviation affects the result of the movement, a method of computing a quantitative accuracy of a test movement relative to a reference movement includes receiving, with a processor, motion capture data that includes a reference movement and a test movement. The test movement is aligned with the reference movement via the processor. The processor computes a quantitative accuracy of the test movement relative to the reference movement and generates, with a display output device, a visualization representative of the test movement. The computed accuracy of the test movement relative to the reference movement is encoded into the visualization.

In some embodiments, the visualization representative of the test movement includes a timeline. The computed accuracy of the test movement relative to the reference movement is encoded into the timeline so as to indicate quantitative values of accuracy for the reference movement at different points in time along the timeline.

In some embodiments, the reference movement is represented as a first sequence of frames that each includes motion capture data corresponding to a respective interval of time of the first sequence, and the test movement is represented as a second sequence of frames that each includes motion capture data corresponding to a respective interval of time of the second sequence. Aligning the test movement with the reference movement includes mapping each frame of the second sequence for the test movement to at least one frame of the first sequence for the reference movement such that a sequence order of the mapped frames in each of the reference movement and the test movement relative to each other is preserved.

In some embodiments, the frames of the second sequence for the test movement are mapped to the frames of the first sequence for the reference movement via a dynamic time warping alignment process that accounts for desynchronization between the test movement and the reference movement.

In some embodiments, the method further includes generating, with the processor and the display output device, a visualization representative of the reference movement that includes a first timeline formed by the frames of the first sequence. The visualization representative of the test movement includes a second timeline formed by the frames of the second sequence. The computed accuracy of the test movement relative to the reference movement is encoded into the timeline so as to indicate quantitative values of accuracy for the reference movement at different points in time along the timeline.

In some embodiments, the processor is further configured to warp the second timeline with reference to the mapping resulting from the dynamic time warping process. The warping includes thickening and condensing portions of the second timeline representative of portions of the test movement performed slower relative to corresponding portions of the reference movement. A quantitative amount for the thickening and condensing is based on the relative rate between the corresponding portions. The warping additionally includes thinning and stretching portions of the second timeline representative of portions of the test movement performed faster relative to corresponding portions of the reference movement. A quantitative amount for the thinning and stretching is based on the relative rate between the corresponding portions In some embodiments, the motion capture data includes records describing at least one of motions, gestures, orientations, and positions performed over time for each of the test movement and the reference movement. The quantitative accuracy of the test movement relative to the reference movement is computed with reference to a quantitative difference in the at least one of motions, gestures, orientations, and positions over time between the test movement and the reference movement.

In some embodiments, the motion capture data includes a plurality of individual test movements that includes the test movement.

In some embodiments, the plurality of individual test movements is in the form of a continuous multi-movement cycle. The processor is further configured to split the continuous multi-movement cycle into individual test movements when aligning the test movement to the reference movement.

In some embodiments, the processor is further configured to compute a respective quantitative accuracy for each of the individual test movements relative to the reference movement. The processor is further configured to generate, with the display output device, a visualization representative of each of the individual test movements, wherein the computed accuracy of the test movement relative to the reference movement is encoded into the visualization.

A system for determining a quantitative accuracy of a test movement relative to a reference movement includes a display output device, a memory, and a processor. The memory is configured to store programming instructions and motion capture data including a reference movement and a test movement. The processor is operatively connected to the display output device and the memory. The processor is configured to execute the programming instructions to determine a quantitative accuracy of the test movement relative to the reference movement. The determination of the accuracy includes aligning the test movement with the reference movement, computing a quantitative accuracy of the test movement relative to the reference movement, and generating, with the display output device, a visualization representative of the test movement, wherein the computed accuracy of the test movement relative to the reference movement is encoded into the visualization.

In some embodiments, the reference movement is represented as a first sequence of frames that each includes motion capture data corresponding to a respective interval of time of the first sequence. The test movement is represented as a second sequence of frames that each includes motion capture data corresponding to a respective interval of time of the second sequence. Aligning the test movement with the reference movement includes mapping each frame of the second sequence for the test movement to at least one frame of the first sequence for the reference movement such that a sequence order of the mapped frames in each of the reference movement and the test movement relative to each other is preserved.

In some embodiments, the processor is further configured to map frames of the second sequence for the test movement to the frames of the first sequence for the reference movement via a dynamic time warping alignment process that accounts for desynchronization between the test movement and the reference movement.

In some embodiments, the determination of the accuracy further includes generating, with the display output device, a visualization representative of the reference movement that includes a first timeline formed by the frames of the first sequence. The visualization representative of the test movement includes a second timeline formed by the frames of the second sequence. The computed accuracy of the test movement relative to the reference movement is encoded into the timeline so as to indicate quantitative values of accuracy for the reference movement at different points in time along the timeline. The processor is further configured to warp the second timeline with reference to the mapping resulting from the dynamic time warping process. The warping includes thickening and condensing portions of the second timeline representative of portions of the test movement performed slower relative to corresponding portions of the reference movement. A quantitative amount for the thickening and condensing based on the relative rate between the corresponding portions. The warping further includes thinning and stretching portions of the second timeline representative of portions of the test movement performed faster relative to corresponding portions of the reference movement. A quantitative amount for the thinning and stretching based on the relative rate between the corresponding portions.

In some embodiments, the system further includes a motion capture device configured to transmit motion capture data to the memory.

In some embodiments, the motion capture device is a pair of motion capture gloves This summary is intended only to introduce subject matter pertaining to quantitatively computing an accuracy of a test movement relative to a reference movement, which is discussed in more detail in the detailed description, the drawings, and the claims, and is not intended to limit the scope of this disclosure in any way.

BRIEF DESCRIPTION OF THE DRAWINGS

The foregoing aspects and other features of the present disclosure are explained in the following description, taken in connection with the accompanying drawings.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

In the following embodiments, for the purpose of illustration, features of this disclosure are discussed with regard to a system to be used with a manual or semi-automatic assembly process, although other uses are contemplated in other embodiments. As discussed above, the efficiency of assembly processes with human workers relies on the accuracy and precision of the movements of those workers. Thus, one aspect of designing and/or maintaining an efficient process is in techniques of evaluating a worker's performance. Unlike conventional systems which consider the outcome of a movement, a system according to this disclosure quantitatively computes accuracies for the movement itself. Further, while conventional systems generally require significant information about the process as well as training data, a system according to this disclosure is configured to compute an accuracy of a movement without any a priori information about the movement, and with very little or even only one sample movement as a reference. A system for quantitatively analyzing a worker's movements has many possible applications.

For example, in some embodiments, a system according to this disclosure is used as a training tool to educate a worker on the proper motions and gestures used to complete a process. An example of the correct movements and gestures are added to the system, either before or at the time of training. The worker then performs the movements and gestures of the process, and receives immediate and quantitative feedback on the accuracy of the worker's movements during the process.

In another example, in some embodiments, a system according to this disclosure is used to quantitatively asses a worker's movements over time. Multiple movements of the worker performing the same process are quantitatively compared relative to a reference movement in order to uncover, for example, problematic steps in the process, and inefficiencies in the process, or to compare the speed and accuracy of the worker to the reference movement and/or to other workers.

Figure 1:
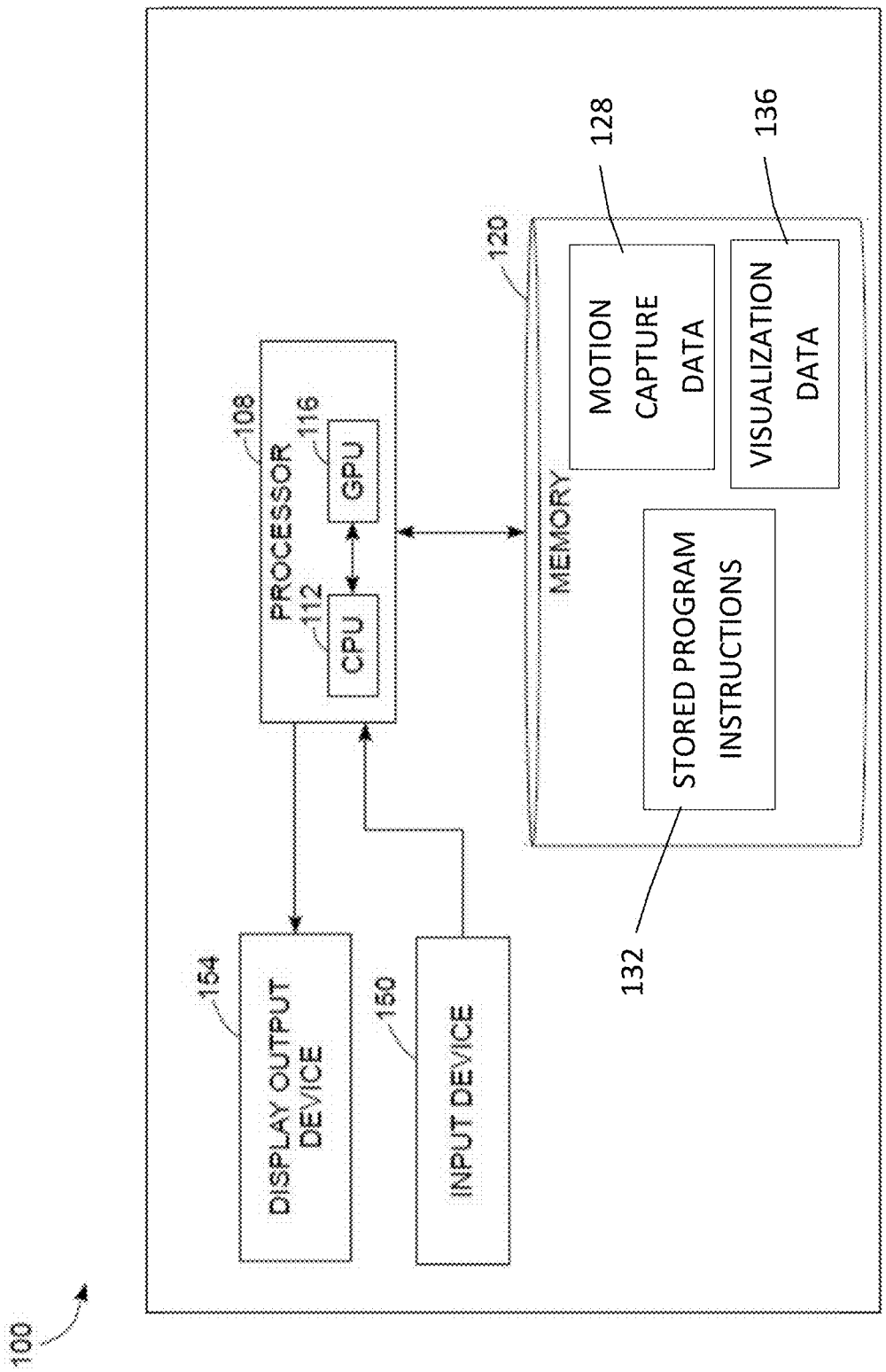
FIG. 1 is a schematic diagram of an exemplary embodiment of a system for computing the accuracy of continuous movement data according to this disclosure.

FIG. 1 is a schematic diagram of an exemplary embodiment of a system 100 for computing the accuracy continuous movement data. In some embodiments, the system 100 quantitatively computes the accuracy, i.e. deviation from a prescribed motion or gesture and deviation from a target time period for completion, of a movement. The system 100 includes a processor 108 that is operatively connected to a memory 120, input device 150, and a display output device 154. As is described in more detail below, during operation, the system 100 (i) receives motion capture data 128 including a reference movement and a test movement, e.g. from the memory 120, input device 150, or another source, (ii) evaluates the accuracy of the test movement relative to the reference movement, and (iii) generates output visualization data 136 of the computation that includes a visual cue or guidance indicative of a quantitative accuracy of the test movement.

In the system 100, the processor 108 includes one or more integrated circuits that implement the functionality of a central processing unit (CPU) 112 and graphics processing unit (GPU) 116. In some embodiments, the processor 108 is a system on a chip (SoC) that integrates the functionality of the CPU 112 and GPU 116, and optionally other components including, for example, the memory 120, a network device, and a positioning system, into a single integrated device, while in other embodiments the CPU 112 and GPU 116 are connected to each other via a peripheral connection device such as PCI express or another suitable peripheral data connection. In one embodiment, the CPU 112 is a commercially available central processing device that implements an instruction set such as one of the x86, ARM, Power, or MIPS instruction set families. The GPU 116 includes hardware and software for display of at least two-dimensional (2D) and optionally three-dimensional (3D) graphics. In some embodiments, processor 108 executes software programs including drivers and other software instructions using the hardware functionality in the GPU 116 to accelerate generation and display of the graphical depictions of models of human movement and visualizations of quantitative computations that are described herein. During operation, the CPU 112 and GPU 116 execute stored program instructions 132 that are retrieved from the memory 120. The stored program instructions 132 include software that control the operation of the CPU 112 and the GPU 116 to generate graphical depictions of human movement and visualizations of quantitative computations based on the embodiments described herein. While FIG. 1 depicts the processor 108 including the CPU 112 and GPU 116, alternative embodiments may omit the GPU 116 since in some embodiments the processor 108 in a server generates output visualization data 136 using only a CPU 112 and transmits the output visualization data 136 to a remote client computing device that uses a GPU and a display device to display the image data. Additionally, alternative embodiments of the processor 108 can include microcontrollers, application specific integrated circuits (ASICs), field programmable gate arrays (FPGAs), digital signal processors (DSPs), or any other suitable digital logic devices in addition to or as replacements of the CPU 112 and GPU 116.

In the system 100, the memory 120 includes both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random access memory (RAM) that stores program instructions 132 and data, including motion capture data 128 and visualization data 136, during operation of the system 100. In some embodiments the CPU 112 and the GPU 116 each have access to separate RAM devices (e.g. a variant of DDR SDRAM for the CPU 112 and a variant of GDDR, HBM, or other RAM for the GPU 116) while in other embodiments the CPU 112 and GPU 116 access a shared memory device.

The memory 120 stores each of the motion capture data 128, program instructions 132, and output visualization data 136 in any suitable format, respectively. In the memory 120, the motion capture data 128 includes raw movement data, as well as processed movement data such as, for example, frame, step, cycle, and time information as discussed in further detail below. The output visualization data 136 includes one or more sets of image data that the system 100 generates to produce a graphical output of the computation of the motion capture data 128. In some embodiments, the processor 108 generates the output visualization data 136 using a rasterized image format such as JPEG, PNG, GIF, or the like while in other embodiments the processor 108 generates the output visualization data 136 using a vector image data format such as SVG or another suitable vector graphics format. The visualization data 136 can also include user interface information usable by the system 100 to receive instructions, such as via a graphical user interface (GUI), with regard to the visualization data 136 such as, for example, stored program instructions 132.

In the system 100, the input device 150 includes any devices that enable the system 100 to receive the motion capture data 128, program instructions 132, and visualization data 136. Examples of suitable input devices include human interface inputs such as keyboards, mice, touch-screens, voice input devices, and the like, as well as motion capture devices such as, for example, cameras, visual sensors, infra-red sensors, ultrasonic sensors, accelerometers, pressure sensors, or the like. One non-limiting example of an input device 150 includes a pair of digital gloves that a user wears while performing cyclical motions. The digital gloves include sensors that capture the motions of the user to generate the motion capture data 128 that are stored in the memory 120. Additionally, in some embodiments the system 100 implements the input device 150 as a network adapter or peripheral interconnection device that receives the motion capture data 128 from another computer or external data storage device, which can be useful for receiving large sets of motion capture data 128 in an efficient manner.

In the system 100, the display output device 154 includes an electronic display screen, projector, printer, or any other suitable device that reproduces a graphical display of the output visualization data 136 that the system 100 generates based on the motion capture data 128. In some embodiments, the system 100 includes multiple display output devices 154, and different portions of the output visualization data 136 are displayed on different display output devices 154.

While FIG. 1 depicts the system 100 implemented using a single computing device that incorporates the display output device 154, other embodiments of the system 100 include multiple computing devices. For example, in some embodiments the processor 108 generates the output visualization data 136 as one or more image data files, and the processor 108 transmits the output visualization data 136 to a remote computing device via a data network. The remote computing device then displays the output visualization data 136, and in this embodiment the processor 108 is operatively connected to the display device in the remote client computing device indirectly instead of via the direct connection that is depicted in FIG. 1. In one non-limiting example, the processor 108 is implemented in a server computing device that executes the stored program instructions 132 to implement a web server that transmits the output visualization data 136 to a web browser in a remote client computing device via a data network. The client computing device implements a web browser or other suitable image display software to display the output visualization data 136 received from the server using a display output device 154 that is integrated into the client computing device.

Figure 2:
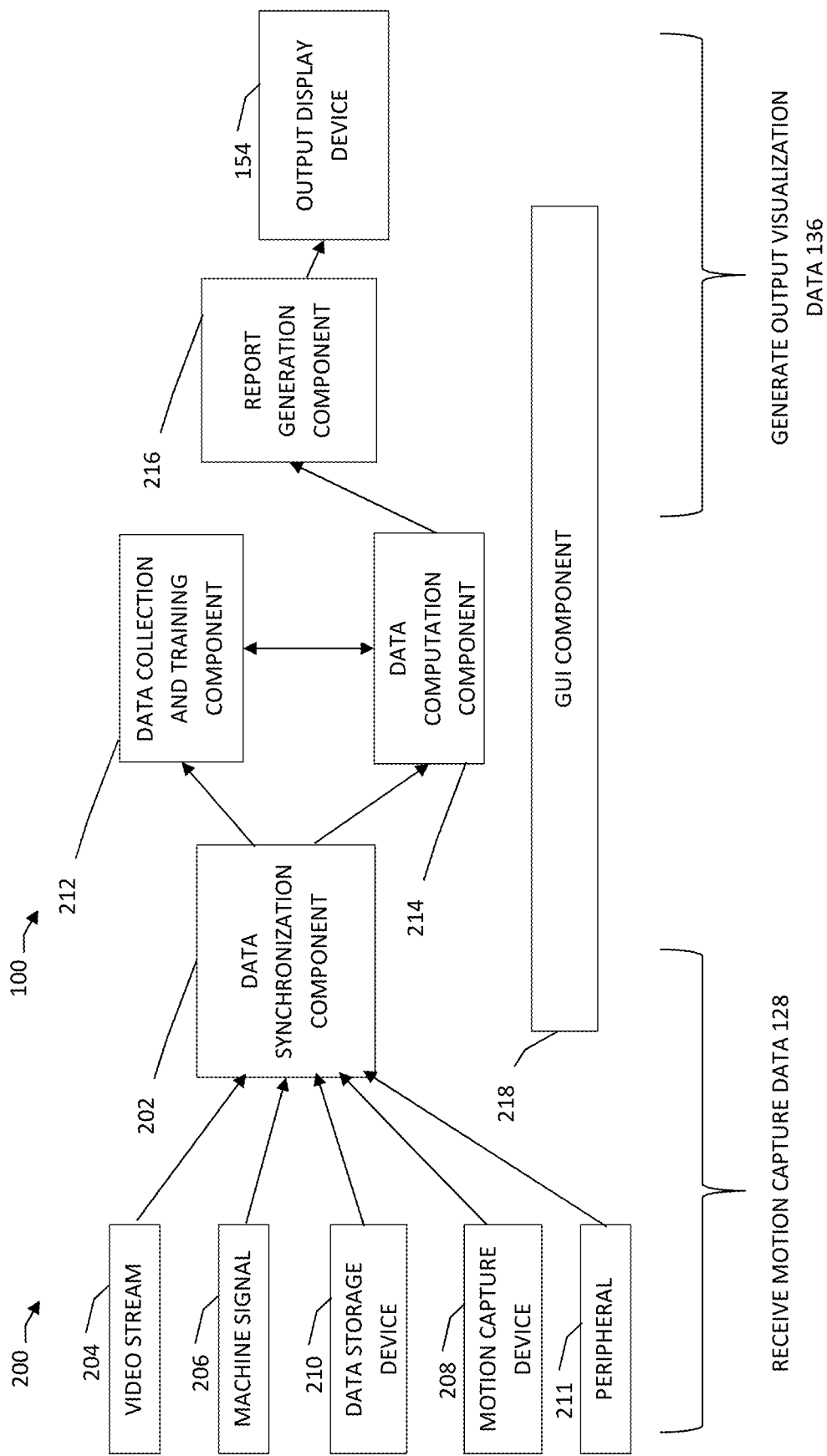
FIG. 2 is a functional block diagram depicting an exemplary embodiment of functional components of the system of FIG. 1.

FIG. 2 is a functional block diagram depicting an exemplary embodiment of functional components 200 for operation of the system 100 as implemented by the processor 108 with reference to the programming instructions 132. Functional components can include hardware or a combination of hardware and software. In the description below, actions described as performed by or with functional components are executed by the processor 108 using the elements of the system 100 discussed above.

Block 202 is a data synchronization component, block 212 is a data collection and training component, block 214 is a data computation component, block 216 is a report generation component, and block 218 is a graphical user interface ("GUI") component, each of which is discussed in further detail below. In the system 100, the processor 108 executes the stored program instructions 132 to enable the CPU 112 and GPU 116 to implement the functions of the data synchronization component 202, the data collection and training component 212, the report generation component 216, and the GUI 218 in conjunction with the other components in the system 100. As depicted in FIG. 2, the system 100 receives motion capture data 128, and generates output visualization data 136 with reference to the received motion capture data 128.

The data synchronization component 202 is configured to receive the motion capture data 128. Motion capture data 128 includes a plurality of records representative of the locations of at least one tracked item or portion of an item over time. For example, in different embodiments, motion capture data 128 includes one or more of records of positions of a reference point on a body part over time or at set time intervals, sensor data taken over time, a video stream or a video stream that has been processed using a computer-vision technique, data indicative of the operating state of a machine over time, etc.

In different embodiments, motion capture data 128 is received via the data synchronization component 202 from different sources. In the embodiment depicted in FIG. 2, motion capture data 128 is received from one or more of a video stream 204, such as from a camera, a machine signal 206, such as a signal indicative of an operating state of a machine or device, a motion capture device 208, such as a sensor (optical, infra-red, ultrasonic, pressure, acceleration, etc.) or a device including one or more such sensors, such as a motion capture glove, a data storage device 210 including files of stored motion capture data, and any other acceptable peripheral device 211. In some embodiments, one or more of the data sources is connected with the system 100 by a wired connection or hardware connection. In some embodiments, one or more of the data sources is connected with the system 100 by a wireless connection. In some embodiments, the motion capture data 128 is received via a network connection, such as the internet.

The data synchronization component 202 is further configured to synchronize motion capture data 128 received from different sources onto a common timeline. For example, in some embodiments, records of the position of a reference point on a body part taken over time are temporally aligned with sensor readings or other forms of motion capture data taken over time.

In some embodiments, the motion capture data 128 includes data representative of more than one continuous movement. In some embodiments, the data synchronization component 202 receives a plurality of motion capture data sets 128 that are each representative of a different continuous movement. The motion capture data 128 for each separate movement is synchronized to a respective timeline corresponding to that movement.

The data collection and training component 212 receives the synchronized motion capture data 128 from the data synchronization component 202. Motion capture data 128 can be generally classified into one of two categories for the purpose of computing the accuracy of a human motion, reference data, i.e. the baseline movement, and test data, i.e. a movement to be compared and quantitatively evaluated for accuracy relative to the baseline movement. In some embodiments, the data collection and training component 212 is configured to classify a first received movement from the motion capture data 128 as a reference movement, and classify any subsequently received movements as test movements.

In some embodiments, the data collection and training component 212 is configured to separate motion capture data 128 into individual movements. In some embodiments, the data collection and training component 212 operates iteratively and/or in conjunction with the data computation component 214 to compute different possible separations of the motion capture data 128 into individual movements and select a separation based on accuracies computed by the data computation component 214.

In some embodiments, a movement or movements in the motion capture data 128 includes a label or labels classifying the movements as reference movements or test movements, respectively. In some embodiments, the data collection and training component 212 is configured to receive an instruction for classifying a movement or movements as reference movements or test movements, such as from a user via the GUI component 218 or from another source.

In some embodiments, the data collection and training component 212 is configured to separate a received movement into frames, whereby a "frame" corresponds to a discrete interval of time. In other words, each frame of a movement includes a portion of the motion capture data 128 corresponding to a portion of the movement occurring during a respective interval of the timeline for that movement. In some embodiments, the duration for the interval corresponding to an individual frame is preset. In some embodiments, the duration for the interval corresponding to an individual frame is set based on an instruction received from, for example, the user via the GUI component 218 or another source. In some embodiments, the duration for the interval corresponding to an individual frame is set with reference to one or more characteristics of the motion capture data 128. For example, in some embodiments, the duration for the interval corresponding to an individual frame is set with reference to one or more of a duration of a reference movement, a total travel distance for the movement, a number of individual motions or gestures within the movement, a speed of the movement, etc. Generally, the same interval for the duration of frames is used for both a reference movement and for test movements to be evaluated relative to the reference movement.

In some embodiments, such as some embodiments where motion capture data 128 is received as a file of stored motion capture data from a data storage device 210, the movement or movements in the motion capture data 128 are separated into frames when received by the data synchronization component 202 and/or the data collection and training component 212.

The data collection and training component 212 is further configured to map frames of the test movement to corresponding frames of the reference movement. As discussed in further detail below, in some embodiments, the test movement and reference movement are synchronized so that frames of the test movement are mapped to frames of the reference movement that correspond temporally, and in some embodiments, the test movement and the reference movement are aligned in terms of gestures and motions within the movement, such that frames of the test movement are mapped to frames of the reference movement that correspond with regard to the sequence of motions and/or gestures performed in the movement.

The data computation component 214 receives the motion capture data 128 from the data collection and training component 212 and/or the data synchronization component 202 that has been classified as a reference motion or test motion, respectively, that has been separated out into frames, and that has been mapped together. The data computation component 214 is configured to compute an accuracy of the test movement or test movements relative to the reference movement, as discussed in further detail below.

In some embodiments, the data collection and training component 212 and the data computation component 214 operate iteratively and/or in conjunction with each other to map frames of a test movement to a reference movement and compute accuracies for the mapped frames. For example, as discussed in further detail below, in some embodiments, the data collection and training component 212 computes multiple different mappings for frames of the test movement to the frames of the reference movement, the data computation component 214 computes an accuracy for the test movement relative to the reference movement for each mapping, and the data collection and training component 212 selects the mapping having a highest accuracy.

The report generation component 216 receives motion capture data 128 and the computed accuracy of the test movements from the data computation component 214, and is configured to generate the output visualization data 136, as discussed in further detail below. The GUI component 218 enables a user to interact with the various components of the system 100 in order to, for example, adjust parameters for the separation of motions into frames, adjust parameters for the computation of the accuracy of test movements, instruct the system 100 to add, remove, or split movements, add step identifications to a movement, and adjust how the output visualization data 136 is displayed, as discussed in further detail below.

Figure 3:
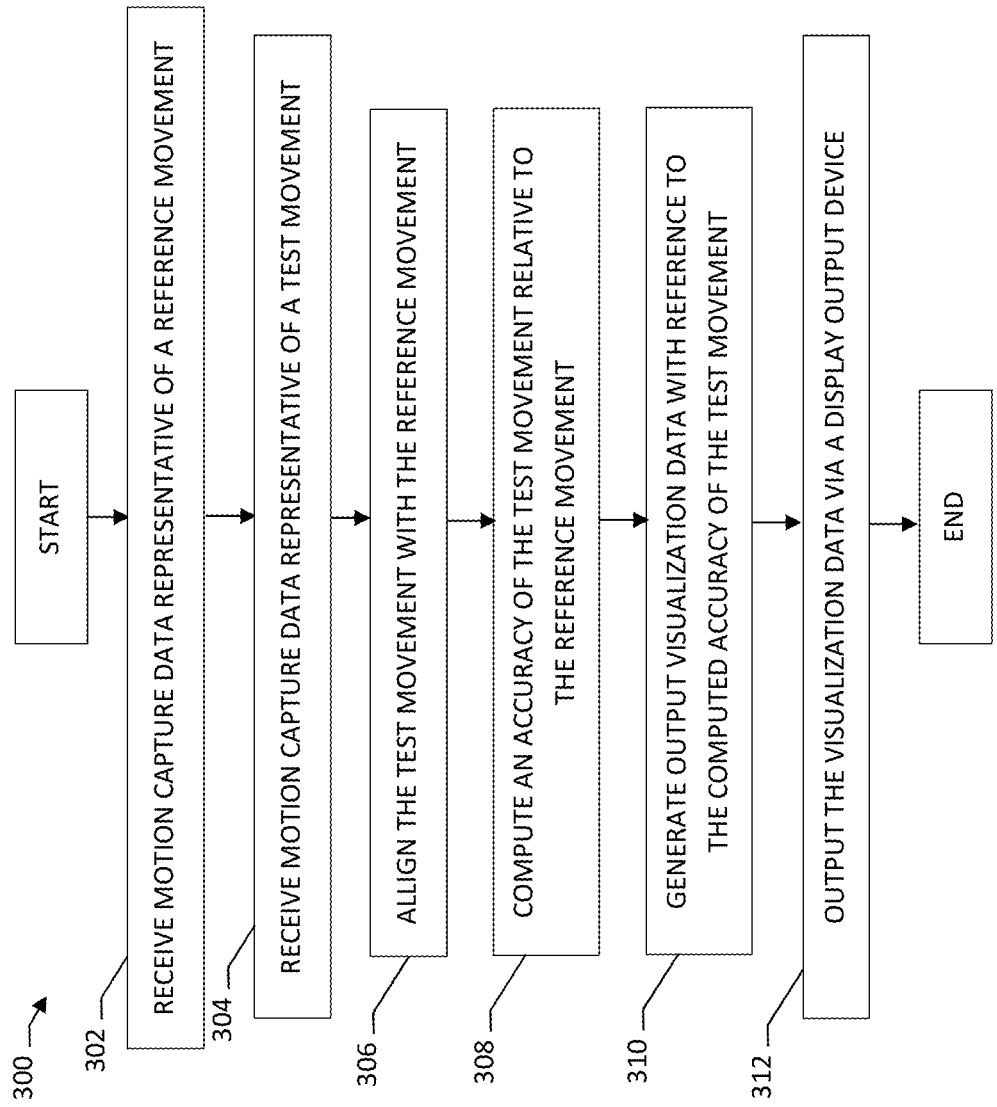
FIG. 3 is a flow diagram that depicts an exemplary embodiment of a method for quantitatively computing the accuracy of continuous movement data.

FIG. 3 is a flow diagram that depicts an exemplary embodiment of a method 300 for quantitatively computing the accuracy of a test movement relative to a reference movement. In the description below, a reference to the process 300 performing a function or action refers to the operation of a processor to execute stored program instructions to perform the function or action in association with other components in a graphical display system. The process 300 is described in conjunction with the system 100 and functional components discussed above with regard to FIGS. 1 and 2 for illustrative purposes.

At block 302, the processor 108 receives motion capture data via the data synchronization component 202, whereby the motion capture data includes data representative of a reference movement. At block 304, the processor 108 receives additional motion capture data via the data synchronization component 202, whereby the additional motion capture data includes data representative of a test movement. At block 306, the processor 108 maps the test movement to the reference movement using the data collection and training component 212. At block 308, the processor 108 computes an accuracy of the test movement relative to the reference movement using the data computation component 214. At block 310, the processor 108 generates output visualization data 136 with reference to the computed accuracy of the test movement relative to the reference movement using the report generation component 216, and at block 312, the output visualization data 136 is outputted to the user via the display output device 154. Further aspects of various blocks in the method 300 are discussed below.

With reference to block 302, in which the processor 108 receives motion capture data that includes data representative of a reference movement, motion capture data 128 is received via the data synchronization component 202 from a variety of sources in different embodiments, as discussed above. In some embodiments, motion capture data 128 is received from a motion capture device 208. In some embodiments, the motion capture device 208 is a set of gloves (not shown) that, when worn by a user, is configured to transmit motion capture data 128 representative of the orientation of the user hands given by a palm-facing direction of each hand, a gesture for each hand given by joint angles for the joints of each hand, and a movement given by the linear acceleration in three dimensions for each hand. In some embodiments, the set of gloves is configured to connect with the system 100 via a wireless connection protocol such as, for example, BLUTOOTH, Wi-Fi, radio transmission, etc. In some embodiments, the set of gloves 208 includes tracking points which are trackable using an optical tracking system such as a camera or infra-red tracking system. In some embodiments, the set of gloves 208 include one or more controls such as a button or switch configured to one or more of cause the system 100 to begin capturing motion capture data 128 transmitted by the set of gloves 208 and cause the system 100 to cease capturing the motion capture data 128. In some embodiments, the processor 108 is configured to store the captured motion capture data 128 in a data file on a data storage device 210, such as in response to an instruction from the user received via the GUI component 218.

In some embodiments, motion capture data 128 is received as a data file from a data storage device 210. For example, in some embodiments, the processor 108 is configured to receive a user instruction via the GUI component 218 to load motion capture data 128 from a data file on a data storage device 210. In some embodiments, portions of motion capture data 128 are received from different sources. For example, in some embodiments, a reference movement is loaded from a data file on a data storage device, and a test movement is captured using a motion capture device 208.

Figure 4:
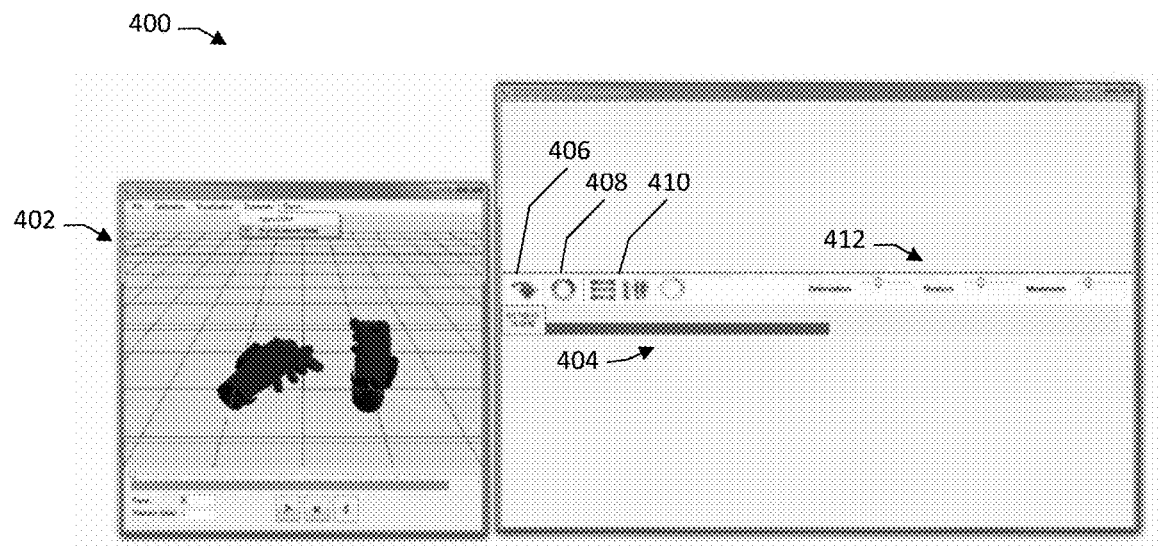
FIG. 4 is an image depicting an exemplary embodiment of a graphical user interface ("GUI") of the system of FIG. 1 for receiving movement data.

In some embodiments, in response to receiving a reference movement, the processor 108 is further configured to use the GUI component 218 to generate output visual data 136 representative of a received movement (e.g. blocks 310 and 312 of FIG. 3). FIG. 4 depicts an image of a GUI 400 showing a three-dimensional animation 402 representative of a user's hands during the received motion, and a timeline representation 404 of the received movement. In this embodiment the received movement is the first movement received by the system 100, and the data collection and training component 212 has classified the received movement as a reference movement.

The GUI 400 includes a variety of tools that enable a user to interact with the system 100. In this embodiment, the GUI 400 includes an import movement button 406 that instructs the system 100 to receive an additional movement, a refresh button 408 that instructs the system to re-evaluate the movements received by the system 100, visualization buttons 410 that instruct the system 100 how to visualize the output visual data 136, and weight adjustment tools 412 that instruct the system 100 as to how to weigh certain factors when computing the accuracy of movements received by the system 100.

Figure 5:
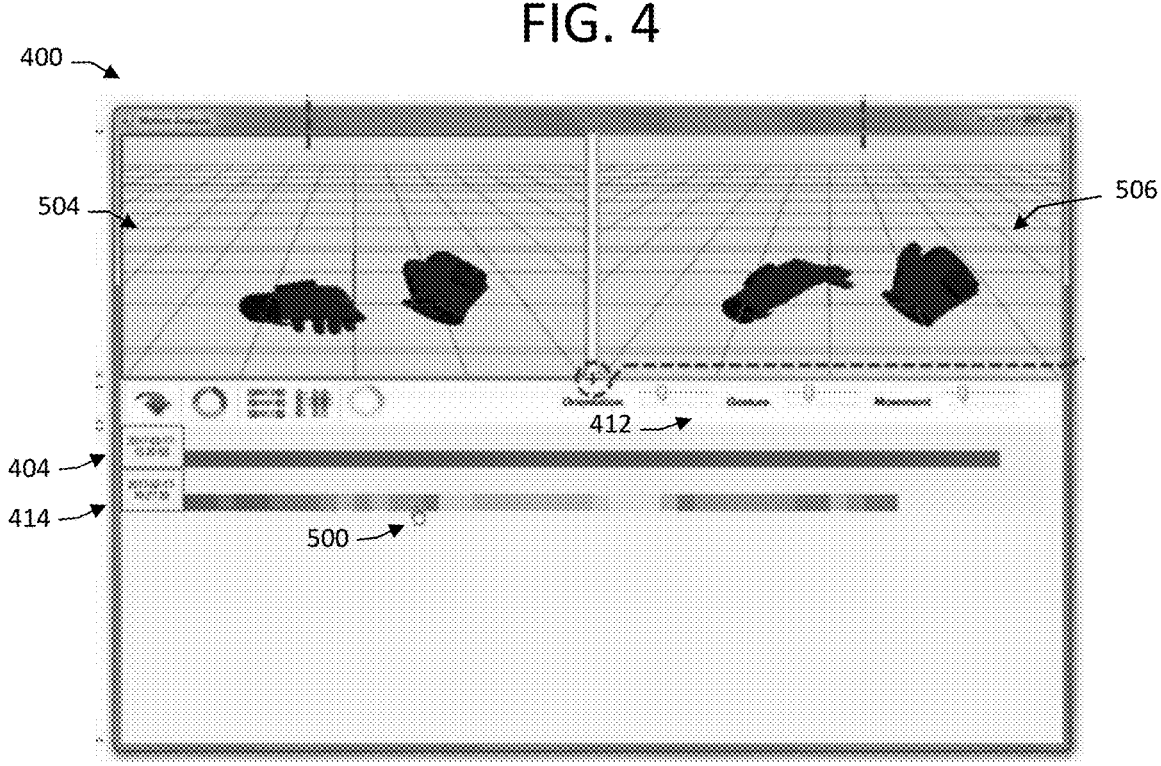
FIG. 5 is an image depicting an exemplary embodiment of a GUI of the system of FIG. 1 for comparing movement data.

With regard to block 304 (FIG. 3), in which the processor 108 receives motion capture data via the data synchronization component 202 that includes data representative of a test movement, the test movement is received in a similar manner to the reference movement, e.g. via a motion capture device 208, from a data storage device 210, etc. In some embodiments, in response to receiving a test movement, the processor 108 is further configured to use the GUI component 218 to generate further output visual data 136 representative of the received test movement (e.g. blocks 310 and 312 of FIG. 3). FIG. 5 depicts an image of the GUI 400 after an additional movement has been received by the system 100. In this embodiment, the data collection and training component 212 has classified the additional movement as a test movement. The GUI 400 in FIG. 5 additionally includes a timeline representation 414 of the test movement.

In some embodiments, the processor 108 receives motion capture data 128 that includes a reference movement followed by one or more test movements. As discussed in further detail below, in some embodiments, the data collection and training component 212 and the data computation component 214 are configured to separate the motion capture data 128 into individual movement in conjunction with processes for mapping a test movement to a reference movement and computing accuracies for the test movement.

With regard to block 306, in which the processor maps the test movement to the reference movement via the data collection and training component 212, the processor 108 maps the frames of the test movement to frames of the reference movement so that motion capture data corresponding to frames of the test movement can be compared to motion capture data corresponding to the mapped frames of the reference movement.

In some embodiments, the processor 108 maps the test movement to the reference movement temporally. In other words, frames of the reference movement are synchronized to frames of the test movement occurring at a same time relative to a start of each motion. As depicted in FIG. 5, the timeline representation 414 of the test movement is temporally aligned with the timeline representation 404 of the reference movement. In other words, vertically aligned frames in the timeline representation 414 of the test movement and the timeline representation 404 of the reference movement occur simultaneously relative to a starting time for each movement, and the timelines 404 and 414 progress at the same rate of 1 frame per frame-time-interval.

As discussed above, a mapping between the reference movement and the test movement enables comparison between frames occurring at a same point in time relative to a start of the movements. In other words, the movements, gestures, orientation, and timing of the test movement is directly comparable with those of the reference movement. In FIG. 5, a curser 500 is used to select a particular frame by navigating to a horizontal location along the timelines 404 and 414, causing the GUI 400 to display a first three-dimensional model 504 depicting the positon and gesture of the reference movement at a time index corresponding to the selected frame, and a second three-dimension model 506 depicting the positon and gesture of the test movement at a time index corresponding to the selected frame so as to enable a visual comparison between the reference movement and the test movement at different times along the timelines 404 and 414. In some embodiments, the models 504 and 506 are playable as a video stream in order to compare the reference movement and test movement over time.

With reference to block 308 (FIG. 3), in which the processor 108 computes an accuracy of the test movement relative to the reference movement using the data computation component 214, the processor 108 compares motion capture data corresponding to the frames of the test movement with the motion capture data corresponding to the mapped frames of the reference movement. In some embodiments, the comparison made by the processor 108 is between one or more of the position, orientation, gesture, and motion of the user's hands for each mapped frame along the timelines 404 and 414. In other words, for each mapped frame, the processor 108 computes an error in the reference motion with respect to a difference in one or more of the position, orientation, gesture, and motion of the user's hands between the test movement and the reference movement. The computed error for each mapped frame represents a quantitative measurement of the accuracy of the test movement relative to the reference movement along each frame of the timeline 414 of the test movement.

In some embodiments, the processor 108 computes a total error for each frame as a weighted combination of the differences in the one or more of the position, orientation, gesture, and motion of the user's hands. In some embodiments, the processor 108 assigns relative weights to the differences based on settings of the weight adjustment tools 412 of the GUI 400. For example, error in each of the position, orientation, gesture, and motion of the user's hands can impact the end result of different processes with different magnitudes. In some processes, the orientation of the user's hands may have little effect on the end result, while the gesture of the user's hands has a relatively large impact. In some processes, the motion of the user's hands may have little impact, while the orientation has a relatively large impact.

With regard to block 310, in which the processor 108 generates, via the report generation component 216, output visualization data 136 with reference to the computed accuracy of the reference movement relative to the test movement, the processor 108, and with regard to block 312, in which the output visualization data 136 is outputted to the user, e.g. via the GUI component 218, the processor 108 encodes the computed accuracy for each frame of the test movement relative to the reference movement into a visual representation of the reference movement. As shown in FIG. 5, in this embodiment, the accuracy for each frame is encoded as the coloring and shading of the timeline representation 414 of the test movement, as discussed in further detail below. Other visual indications of accuracy are used in other embodiments, such as numerical labels, a pattern or image fill, a graph, etc. In this embodiment, a coloring and shading from green to yellow to red is indicative of frames along the timeline 414 where the test movement is more accurate, moderately accurate, and less accurate, respectively, relative to the reference movement. Other coloring and shading gradients are used in other embodiments.

Figure 6A:
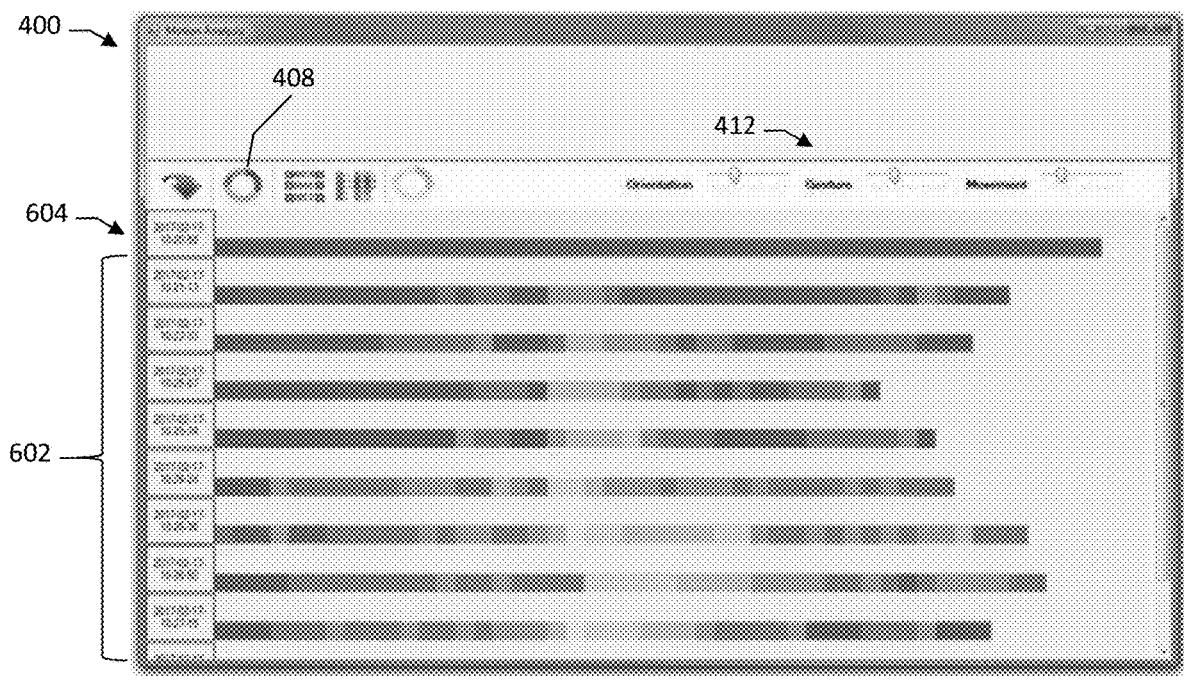
FIG. 6a is an image depicting another exemplary embodiment of a GUI of the system of FIG. 1 for comparing movement data.
Figure 6B:
FIG. 6b is an image depicting another exemplary embodiment of a GUI of the system of FIG. 1 for comparing movement data.

In some embodiments, the processor 108 is configured to perform additional computations of accuracy of the test movement, such as in response to a change in a parameter of the computation or an instruction received from a user via the GUI component 218. FIG. 6a depicts an image of the GUI 400 depicting output visualization data 136 for a plurality of test movements 602 relative to a reference movement 604 computed by the processor 108 given particular parameters for the settings of the weight adjustment tools 412 of the GUI 400. By adjusting the settings of weight adjustment tools 412, and activating the refresh button 408, the user can instruct the system 100 to re-compute the accuracy of the test movements 602 based on the adjusted settings. FIG. 6b illustrates how the computed accuracy for the test movements 602 changes given different settings for the weight adjustment tools 412'.

While computing the accuracy of the test movement relative to the reference movement with the timelines 404 and 414 synchronized with each other temporally (FIG. 5) provides a direct comparison between the reference movement and the test movement at any given point in time, such computation may not be robust with regard to desynchronization between the reference movement and the test movement. As used herein "desynchronization" between a reference movement and a test movement refers to instances where the reference movement includes the performance of similar motions and gestures as the reference movement, but on a different time scale. A reference movement that exactly performs the motions and gestures of the reference movement, but does so slightly faster or slower would appear to have a lower accuracy under a direct time comparison due to the desynchronization of the motions and gestures between the two movements. Thus, a computation technique that is robust to different rates of movement would be beneficial.

With regard again to block 306 (FIG. 3) in which the processor maps the test movement to the reference movement via the data collection and training component 212, in some embodiments, the processor 108 is configured to map the movements based on similar motions and gestures, regardless of whether the test motion and reference motion are desynchronized such that similar motions and gestures occur at different times. In other words, the processor 108 is configured to map frames of the test movement to frames of the reference movement that correspond with regard to the sequence of motions, gestures, and/or orientations performed in the movements.

In some embodiments, the processor 108 determines a correspondence between desynchronized motions, gestures, and/or orientations via semantic analysis. In other words, since a particular motion may occur at different times in the reference motion and in the test motion, in some embodiments, the processor 108 is configured to classify motion capture data in frames as particular motions, gestures, and/or orientations, and map frames of the test movement to frames of the reference movement based on similar classifications between frames. However, classifying motion capture data as particular motions, gestures, and/or orientations may not only be computationally intensive, but also may require training data that may itself be expensive and time-consuming to assemble. Therefore, a technique for determining correspondence between desynchronized motions, gestures, and/or orientations that is agnostic with regard to semantics of the motions, gestures, and/or orientations would be beneficial.

In some embodiments, the processor 108 computes the mapping between frames via a dynamic time warping ("DTW") alignment process, which is a technique for comparing sequences that may vary in speed by computing an optimal matching between discreet portions of the sequences. DTW includes computing a "warping path" that corresponds to a mapping between a portion of one sequence and a similar portion of another sequence occurring at a different time or rate.

Figure 7:
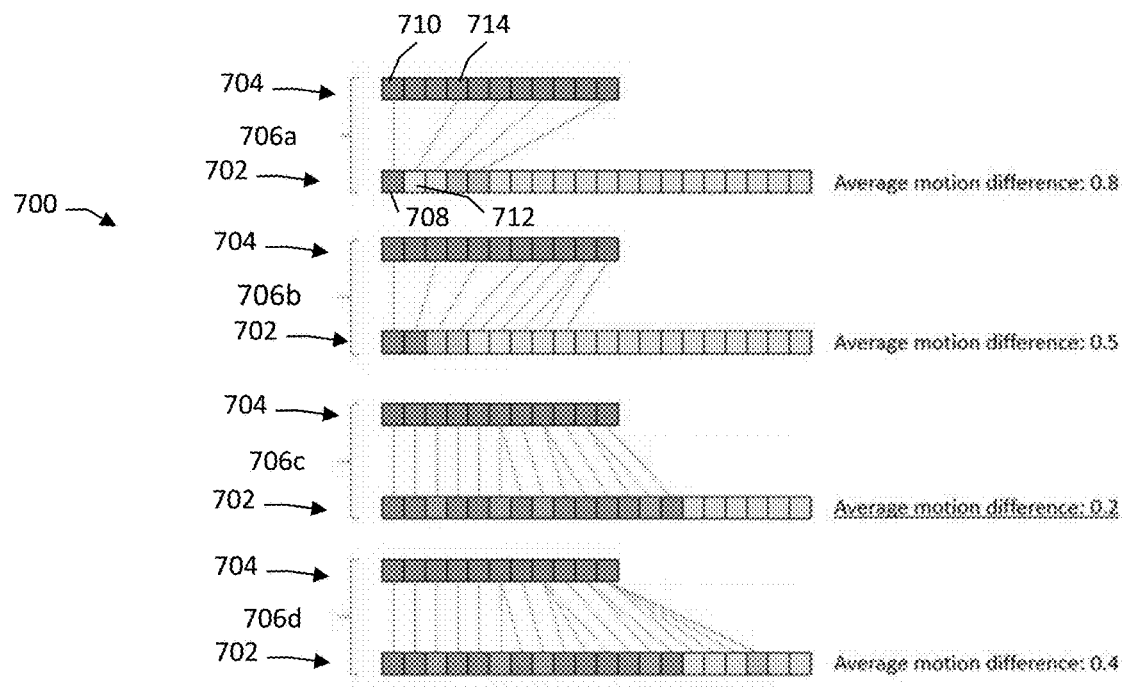
FIG. 7 is a visual depiction of an exemplary embodiment of a process using dynamic time warping to align movement data from different movements.

FIG. 7 is a visual depiction 700 of an exemplary embodiment of the processor 108 using DTW to determine a warping path mapping of a test movement 702 that optimally aligns motions, gestures, positions, and orientations in the test movement 702 to motions, gestures, positions, and orientations in the reference movement 704. The processor 108, using DTW, computes a mapping between the reference movement 704 and the test movement 702 without the requirement of semantic knowledge of the motions, gestures, positions, and orientations in the timelines. Without a priori knowledge of the semantics of the timelines, the processor 108 treats the endpoint of the test movement 702 and the rate at which motions, gestures, positions, and orientations in the test movement are performed as unknowns.

As shown in FIG. 7, the processor 108 prepares a plurality of trials 706a-d that each includes a different selection for a frame of the test movement as an end point, and thus include a different warping path between the movements. In FIG. 7, four trials are depicted, but in other embodiments, any number of trials can be used. FIG. 7 also depicts quantified values for the average motion difference between the reference movement 704 and the test movement 702 given the warping path for each trial. It should be understood that as used herein, the "warping" of DTW does not result in modification of the rate of the test movement or reference movement. Rather, "warping" in this context means the computation of the warping path that aligns desynchronized frames that have similar motion, gesture, and/or orientation data.

For each trial 706a-d, the processor 108 determines an optimal mapping of frames of the test movement 702 to a frame or frames of the reference movement 704 that preserves a sequence order of the mapped frames in each movement relative to each other. Preserving the sequence order means that the warping path for the mapping progresses monotonically. For example, in the first trial 706a, while the first frame 708 of the test movement 702 is mapped to the first frame 710 of the reference movement 704, the second frame 712 of the test movement 702 is mapped to the fourth frame 714 of the reference movement 704. While the second mapping between frames 712 and 714 is not temporally aligned (i.e. frame 714 of the reference movement is displaced temporally from the frame 712 in the test movement by two frames), the sequence of the first mapped frames 708, 710 being prior to the second mapped frames 712, 714 is preserved. As depicted in trials 706b-d, while each frame of the test movement 702 is mapped to precisely one frame of the reference movement 704, in some mappings, more than one frame of the test movement 702 is mapped to a single frame of the reference movement 704. Further, as depicted in trials 706a and 706b, in some mappings, not all of the frames of the reference movement 704 are mapped to a frame of the test movement 702.

Here, an optimal mapping of a trial with a given end frame means a mapping from amongst the possible mappings for that trial having a lowest average error relative to the reference movement. For each mapping, the processor 108 computes the average error of a trial by averaging the individual errors of each frame in the test movement 702 for the trial given that particular mapping. The error for each frame of the test movement given a particular mapping is computed as the difference between one or more of the motions, orientations, and/or gestures in the frame of the test movement and the frame of the reference movement mapped to that frame. Thus, the warping path and the average motion difference depicted in FIG. 7 for each trial 706a-d corresponds to the optimal mapping for the test movement 702 given the particular end frame for each trial 706a-d.

The processor 108 selects the trial having the lowest average error as the trial having the closest correspondence between motions, orientations, and gestures in the test movement 702 and the reference movement 704. In FIG. 7, trial 706c has the lowest average motion difference score, which corresponds to the lowest error level in the observed test motion sequences, and thus has the closest correspondence between the movements 702 and 704. By selecting the trial 706c, the processor 108 also determines an optimal end frame for the test movement 702 that corresponds to the end of the reference movement 704.

The warping path determined for the test movement 702 is indicative of the relative rates of the two movements. Instances where more than one frame in the test movement 702 are mapped to a same frame in the reference movement 704 are indicative of a portion of the test movement 702 that was performed slower than the reference movement, and instances where a frame of the reference movement 702 was not mapped to a frame of the test movement 704 are indicative of a portion of the test movement 702 that was performed faster than the reference movement 704. Further, instances where the mapping between frames is temporally displaced (e.g. the warping path lines in FIG. 7 are slanted) are indicative of similar motions, gestures, and/or orientations that are mapped together despite being desynchronized.

Additionally, with reference again to block 308 in FIG. 3, in which the processor 108 computes an accuracy of the test movement relative to the reference movement, the error for each frame of the test movement is given from the error for each frame of the selected trial. Thus, the error for each frame of the test movement is a quantitative assessment of the accuracy of the test movement relative to the reference movement that is robust to portions of the test movement being performed at different rates than the reference movement.

With reference again to block 310 in FIG. 3, the processor 108 generates, via the report generation module 216, output visualization data 136, and again to block 312, in which the processor 108 output the output visualization data 136 to the user via the GUI component 218, in some embodiments, the processor 108 encodes the computed accuracy for each frame of the test movement relative to the reference movement into a visual representation of the reference movement in the same manner as discussed above. In other words, in some embodiments, the processor 108, via the GUI component 218, depicts the timelines for the test movement and the reference movement as temporally synchronized, similar to the depictions in FIGS. 5, 6a, and 6b. However, such depiction may not account for potential desynchronizations between the test movement(s) and the reference movement. Therefore, a visual depiction of the test movements that accounts for desynchronizations would be beneficial.

Figure 8:
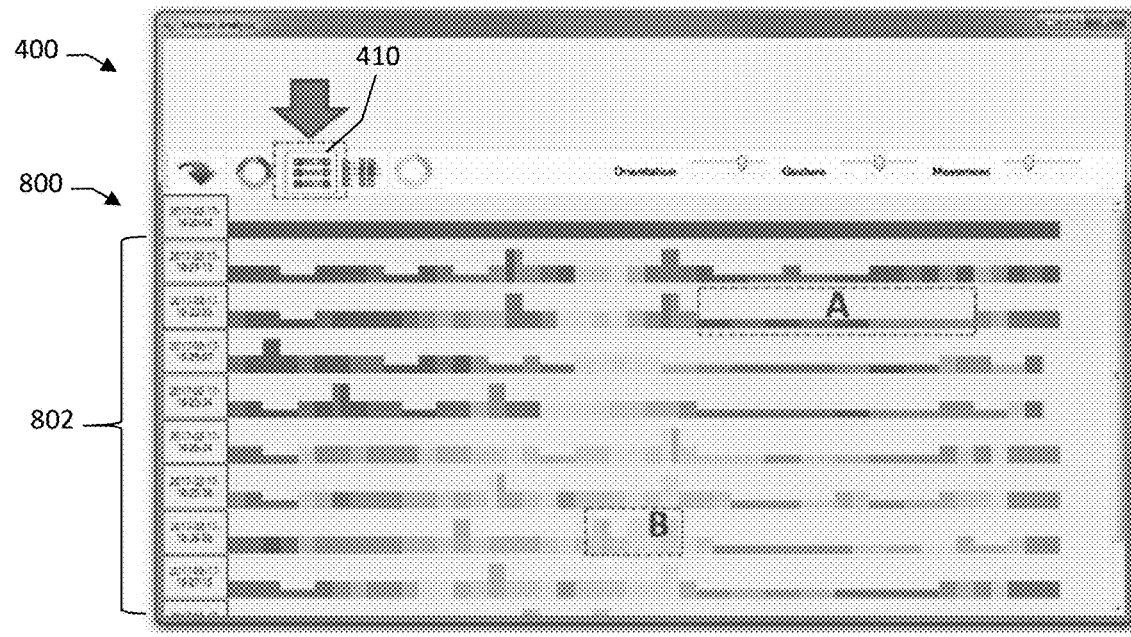
FIG. 8 is an image depicting another exemplary embodiment of a GUI of the system of FIG. 1 for comparing movement data.

As noted above, the GUI 400 includes a visualization buttons 410 that enables a user to select different visualizations of the test movements. FIG. 8 depicts the GUI 400 with a visualization 800, selectable via the visualization buttons 410, that visually accounts for potential desynchronizations between the test movement(s) and the reference movement. In FIG. 8, the processor 108 has compressed and expanded the visualization of the timelines for test movements 802 with reference to warping path mappings determined via DTW. Portions of the timelines 802, such as the region "A", where the test movement was performed faster than corresponding portions of the reference movement are stretched horizontally so that the portion are horizontally aligned despite a different in rate. The height of such portions is also decreased corresponding to the amount of horizontal stretching. Portions of the timelines 802, such as the region "B", where the test movement was performed slower than corresponding portions of the reference movement are compressed horizontally, so that the portions are horizontally aligned despite a difference in rate. The height of such portions is also increased corresponding to the amount of horizontal compression. As a result, the rates at which portions of the test movements were performed are encoded into the visualization 800 along with the encoding of the accuracy of each frame.

For example, the nominally green coloring of the portion "A" indicates that despite being performed faster (the timeline is thinned), the motions, gestures, and/or orientations for this portion of the test movement were performed accurately to the reference motion. In another example, the nominally orange and yellow coloring of the portion "B" indicates that despite being performed slower (the timeline is thickened), the motions, gestures, and/or orientations for this portion of the test movement were performed less accurately to the reference motion.

Figure 9A:
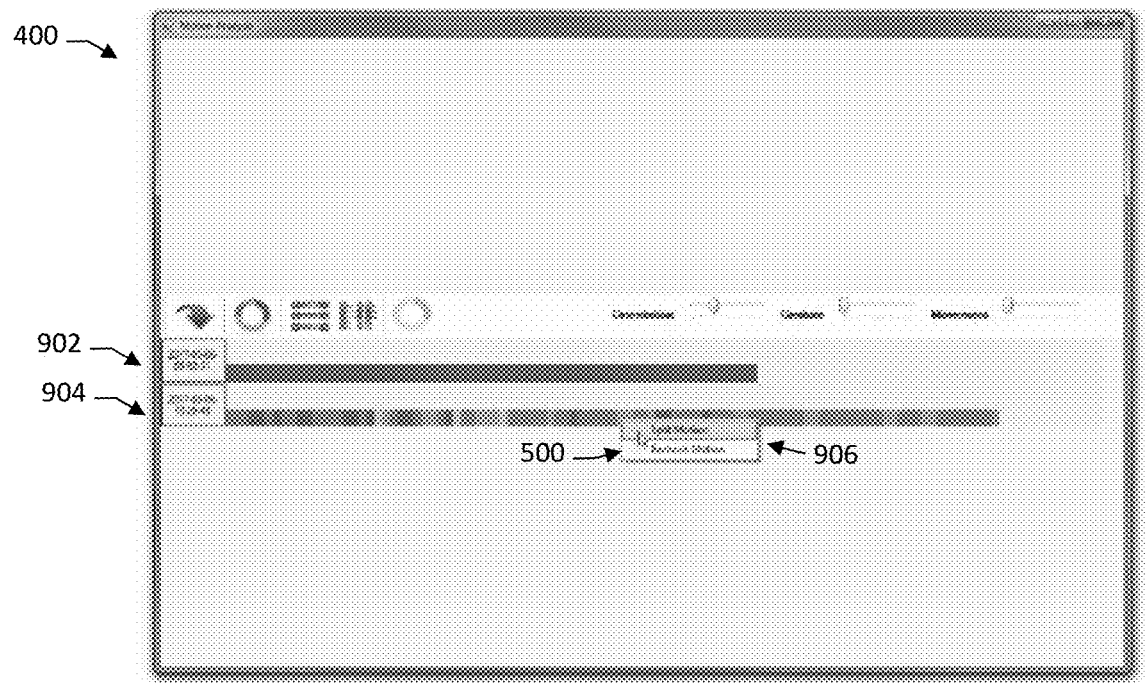
FIG. 9a is an image depicting an exemplary embodiment of a GUI of the system of FIG. 1 for splitting movement data apart.

With further reference to blocks 302 and 304 FIG. 3), in which motion capture data 128 is received by the system 100, in some embodiments, a movement to be evaluated is a "cycle," i.e. a movement that is repeated one after another. For example, in many manufacturing processes, a worker will perform a set of steps, and upon completing the set will repeat the set from the beginning. Thus, in some embodiments, motion capture date 128 received by the system 100 includes data representative of more than one cycle of movements. FIG. 9a depicts a GUI 400 after a reference movement 902 and a multi-movement cycle 904 have been received by the system 100. In this embodiment, the multi-movement cycle 904 is a continuous combination of two movements, one performed directly after the other.

Figure 9B:
FIG. 9b is an image depicting another exemplary embodiment of the GUI of FIG. 9a after movement data has been split apart.

In some embodiments, the GUI 400 enables a user to manually split a multi-movement cycle into separate movements. For example, the user can use the curser 500 to view frames along the multi-movement cycle 904 and identify an end frame of the first movement within the multi-movement cycle 904. As depicted in FIG. 9a, the user selects the identified end frame, and instructs the system 100 (in this embodiment via a menu selection 906) to split the multi-movement cycle 904 at the selected frame. FIG. 9b depicts the GUI 400 after the multi-movement cycle 904 has been split into two separate movements 908 and 910. Note that the scale of the timelines has been changed between FIG. 9a and FIG. 9b to better fit the split data.

In some embodiments, however, a multi-movement cycle may include a large plurality of movements. In some embodiments, it may also be difficult to visually identify an exact frame that separates one movement from the next. Therefore, a system that automatically identifies and separates movements in a multi-movement cycle would be beneficial.

With further reference to block 308 (FIG. 3), in which the processor 108 computes accuracies for test movements, as discussed above, in embodiments where the processor 108 uses DTW to compute a mapping between a test movement timeline and a reference movement timeline, the processor 108 treats the endpoint of the test movement as an unknown. In some embodiments, a frame of a test movement timeline is selected as an endpoint despite there being further frames after the selected end point. In some embodiments where the test movement timeline is a multi-movement cycle, the frame selected as an endpoint is also indicative of a frame that separates one movement from the next successive movement. In some embodiments, the processor 108 is configured to split a test movement timeline based on the endpoint frame determined via DTW. Such a split results in a movement mapped to the reference movement as discussed above, and a remainder.

In some embodiments, the processor 108 successively performs DTW on the remainder in order to split off successive movements within the multi-movement cycle. In this manner, the processor 108 is configured to split continuous motion capture data 128 that includes multiple movements performed one after the other into separate movements, with separate accuracies computed in the manner discussed above.

Each movement split off from the multi-movement cycle also has a respective average error, computed in the manner discussed above. In some embodiments, the processor 108 is further configured to compute a confidence in the splits of the multi-movement cycle, whereby "confidence" means how likely it is that a given split accurately separates two movements from each other. In some embodiments, confidence is computed by measuring a slope (i.e. trend) of the error at neighboring frames at a location of a given split. In some embodiments, the error utilized for comparing movements in a cycle and for computing confidence of splits is the error between motions from the test movements to the reference movement.

With further reference to blocks 310 and 312 (FIG. 3), in which the processor 108 generates output visualization data 136 and outputs the data 136 to the user, in some embodiments, the processor 108 is further configured to generate output visualization data 136 descriptive of additional aspects of the computed accuracies.

Figure 10:
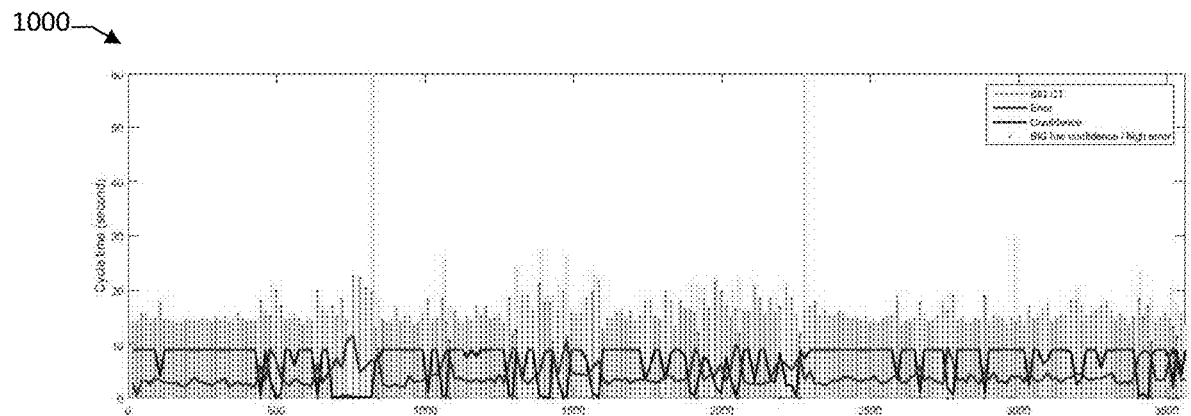
FIG. 10 is a graph of movement times, average movement error, and split confidence for motion capture data with multiple successive movements taken over time.

In some embodiments, the processor 108 is configured to generate output visualization data 136 descriptive of multi-movement cycles. FIG. 10 depicts a graph 1000 of movement times, average movement error, and split confidence computed for motion capture data taken for a cycle performed over 3,500 seconds, with the overall time on the horizontal axis, and the time of an individual movement on the vertical axis. In the graph 1000, movements that conform to the reference movement are colored green, and movements that are non-conforming are colored purple. In some embodiments, the processor 108 is configured to classify movements with relatively low error and relatively high confidence as conforming, and movements with relatively high error and relatively low confidence as non-conforming. The graph 1000 enables a user to batch analyze the accuracy of a large number of cycles at once. For example, the color encoding for each movements allows a user to quickly identify a particular movement that is non-conforming, whereby the accuracy of that individual movement can then be quantitatively analyzed in the manner above to identify the particular motion, gesture, position, and/or orientation that resulted in the non-conforming motion.

Figure 11:
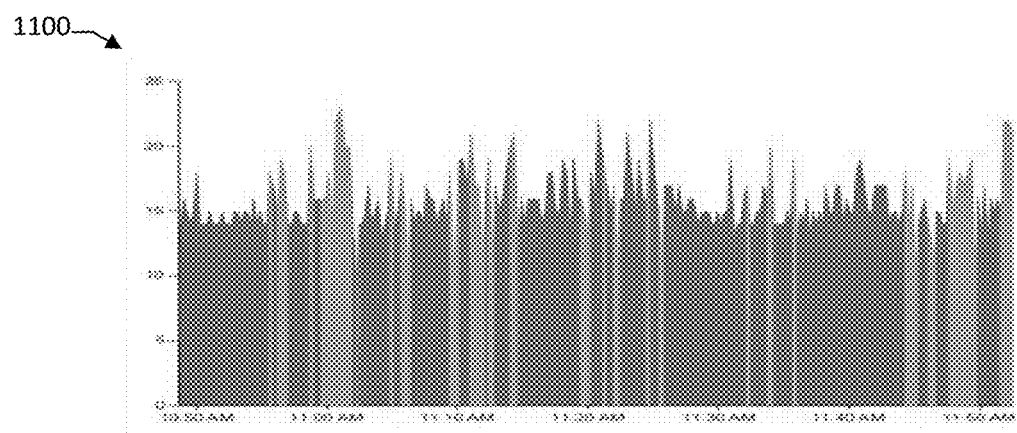
FIG. 11 is a graph of movement times for motion capture data with multiple successive movements taken over time.

FIG. 11 depicts a graph 1100 of successive movement times taken over a period of approximately one hour, with the overall time on the horizontal axis, and the time of an individual movement on the vertical axis. In the graph 1100, conforming movements are colored blue, and non-conforming movement are colored red. In some embodiments, the processor 108 is configured to classify movements with an average error below a predetermined threshold as conforming, and movements with an average error at or above a predetermined threshold as non-conforming. The graph 1100 allows a user to quickly identify non-conforming movements from a large batch of data.

In some embodiments, the processor 108 is further configured to generate output visualization data 136 descriptive of semantics of the movements. As noted above, the processor 108 is configured to compute accuracies for test movements in a manner that is agnostic to the semantics of the motions, gestures, positions, and/or orientations in the movements. However, semantic labels for individual motions, gestures, positions, and/or orientations in a movement may be useful in identifying why a movement deviated from the reference movement. Therefore, a system that enables semantic comparison of movements would be beneficial. A system that computes movement accuracies agnostically with respect to semantics while still enabling a semantic comparison would also be beneficial.

Figure 12:
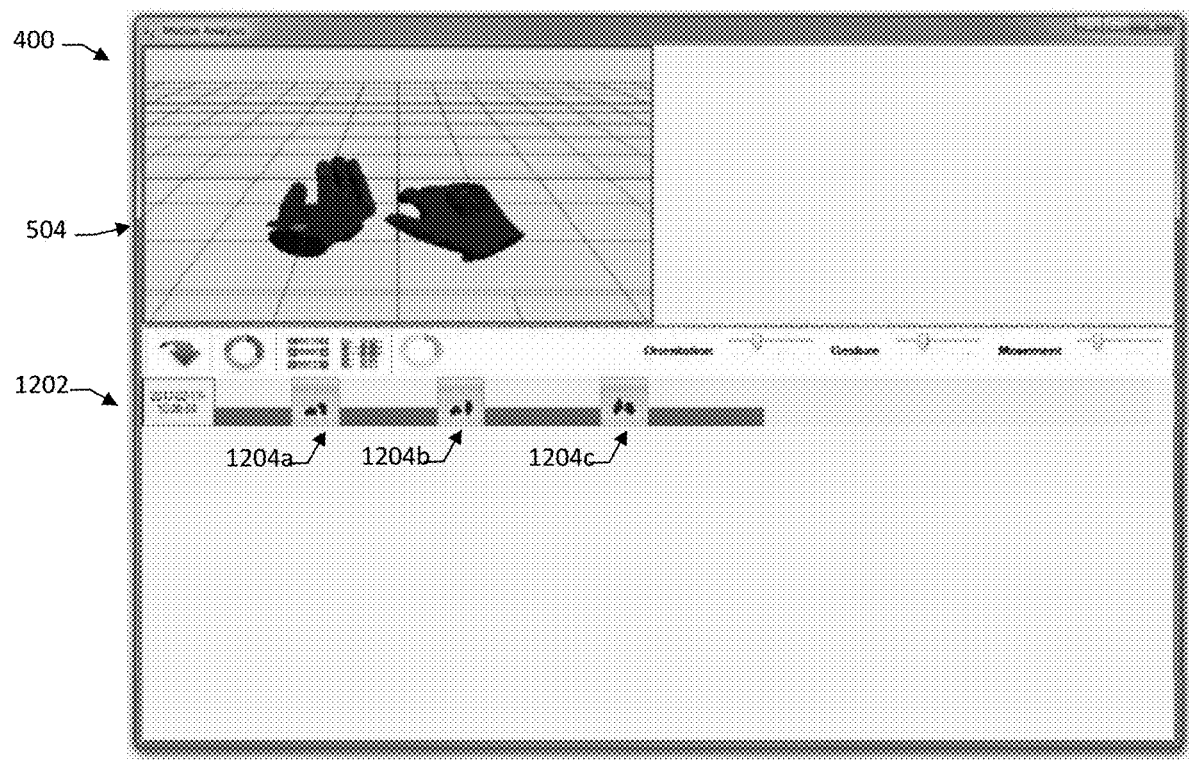
FIG. 12 is an image depicting another exemplary embodiment of a GUI of the system of FIG. 1 for comparing movement data.

FIG. 12 depicts a GUI 400 after a reference movement 1202 has been received by the system 100. The GUI 400 enables a user to select a particular frame in the timeline of the movement 1202, and add a key frame label to the selected frame, such as the key frame label 1204a-c. In different embodiments, a key frame label is indicative of a particular step within a movement, a particular pose within a step, or other information pertinent to the movement. For example, a cycle for a manufacturing assembly line could include successively repeated movements that each include a sequence of steps such as: step 1—"pick up a screw by its top, with a left hand with all fingers touching the screw"; step 2—"grab an injector by its side using a right hand;" etc., and a key frame label can be used to identify frames in the reference movement corresponding to commencement of a particular step, completion of the step, a point of interest during the step, etc. In FIG. 12, the key frame labels 1204a-c each include an image of the model 504 of the reference motion at the corresponding frame. In other embodiments, the key frame labels include other visualizations such as, for example, step name labels and/or description, timestamps, etc.

Generally, at least of portion of the semantics of a reference movement is known. In many cases, a reference movement is performed by an experienced worker or other individual with an understanding of the correct motions, gestures, and orientations for the movement as well as important steps on the process corresponding to the movement. It would also be beneficial to identify semantics of test movements. For example, if a certain step in a process is important, dangerous, or difficult, it would be beneficial to be able to highlight that step when training a new worker, evaluate how that step in particular is performed relative to the rest of the process, or other similar tasks. However, test movements may or may not be accurate, and may or may not be performed by a user with a priori understanding of the semantics of the movement. Further, in instances where a multitude of test movements are assessed, manually entering key frames for each movement can be time consuming and complicated. Thus, a system that does not require manual entry of semantics for test movements would also be beneficial.

Figure 13:
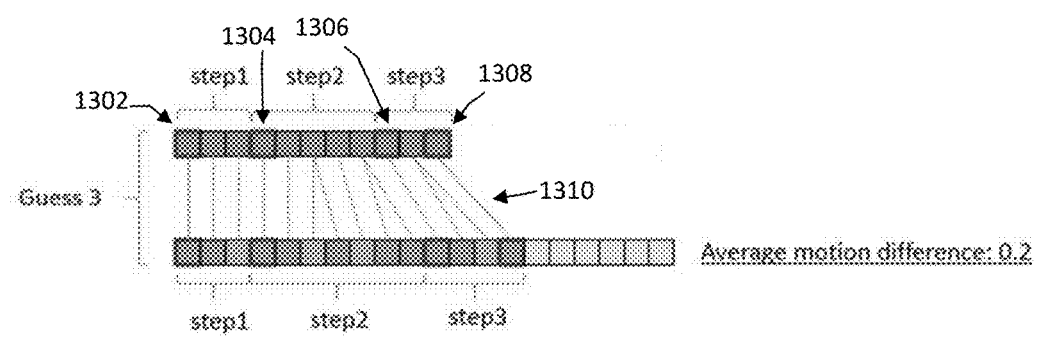
FIG. 13 is a visual depiction of another exemplary embodiment of a process using dynamic time warping to align semantic information in movement data from different movements.

In some embodiments, the processor 108 is configured to propagate key frame labels 1204 from a reference movement to test movements received by the system 100 with reference to the mapping computed for the test movement to the reference movement (block 306). FIG. 13 depicts a visualization of the processor 108 propagating key frame labels from a reference movement to a test movement. Steps for the reference movement have already been added by the user in the manner discussed above, whereby a first key frame label 1302 indicating a start to step 1, a second key frame label 1304 indicating a start to step 2, a third key frame label 1306 indicating a start to step 3, and a fourth key frame label 1308 indicating an end to the movement.

With reference to the mapping 1310 between the reference movement and the test movement, the processor 108 is configured to identify frames in the test movement corresponding to the key frame labels 1302-1308 in the reference movement and propagate the key frame labels to the identified frames in the test movement. In the event a key frame label is added to a frame in the reference movement that is not mapped to a frame of the test movement, in some embodiments, the processor 108 is configured to propagate the key frame label to a nearby frame that is mapped to the test movement. In the event a key frame label is added to a frame in the reference movement that is mapped to multiple frames in the test motion, in some embodiments, the processor 108 is configured to propagate the key frame label to the chronologically first (left-most) mapped frame in the test movement.

Thus, in some embodiments, the processor 108 is configured to propagate key frames or step labels from a reference movement to a test movement without the need of manually identifying any frames in the test movement. The mapping between the movements and the semantic information for the reference movement is used to compute semantic information about the test movement movement without a semantic analysis of the test movement.

Figure 14:
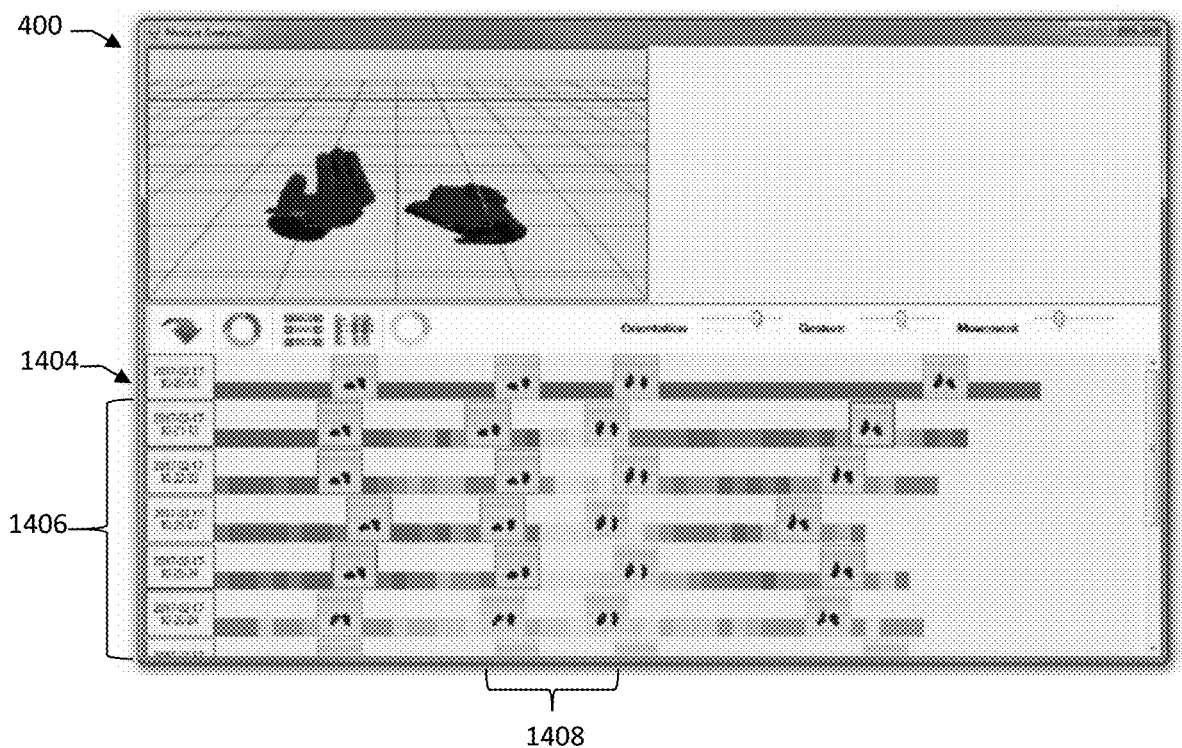
FIG. 14 is an image depicting another exemplary embodiment of a GUI of the system of FIG. 1 for comparing movement data.

FIG. 14 depicts a GUI 400 whereby key frame labels in a reference movement 1404 have been propagated to a plurality of different test movements 1406. In FIG. 14, the movements are aligned temporally, as discussed above. In some embodiments, the semantic information for the test movements computed by propagating key frames from the reference movement 1404 to the test movements 1406 is used to determine additional information and/or trends in the test movements 1406. For example, in FIG. 14, the portion of the test movements 1406 within the third step 1408 are illustrated as more yellow, and thus less accurate, than other portions of the test movements 1406. This indicates that the third step 1408 may be more problematic than other steps in the process. Information, such as average step time, problematic steps, etc. is determined in similar manner via visual inspection of the GUI 400.

Figure 15:
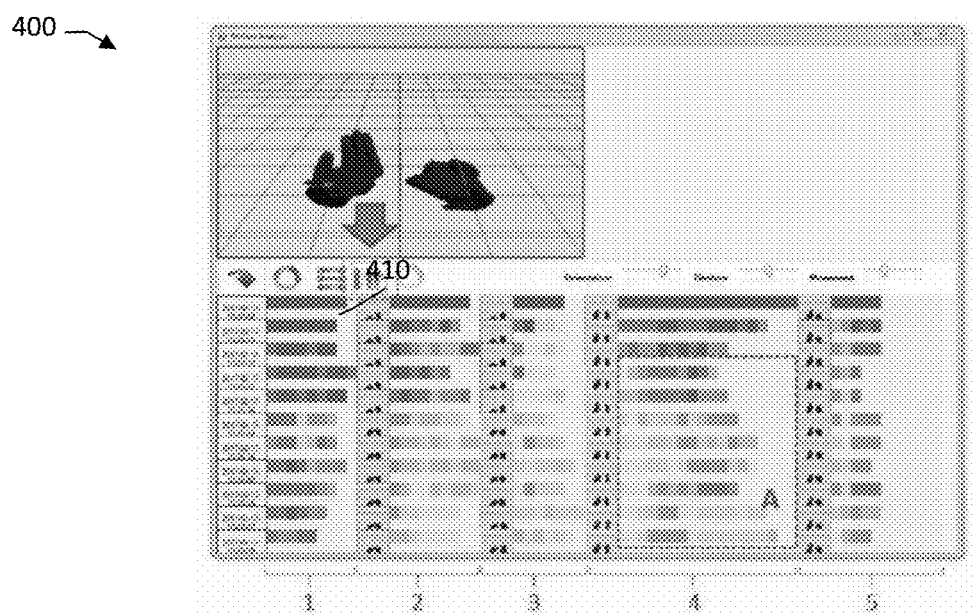
FIG. 15 is an image depicting another exemplary embodiment of a GUI of the system of FIG. 1 for comparing movement data.
Figure 16:
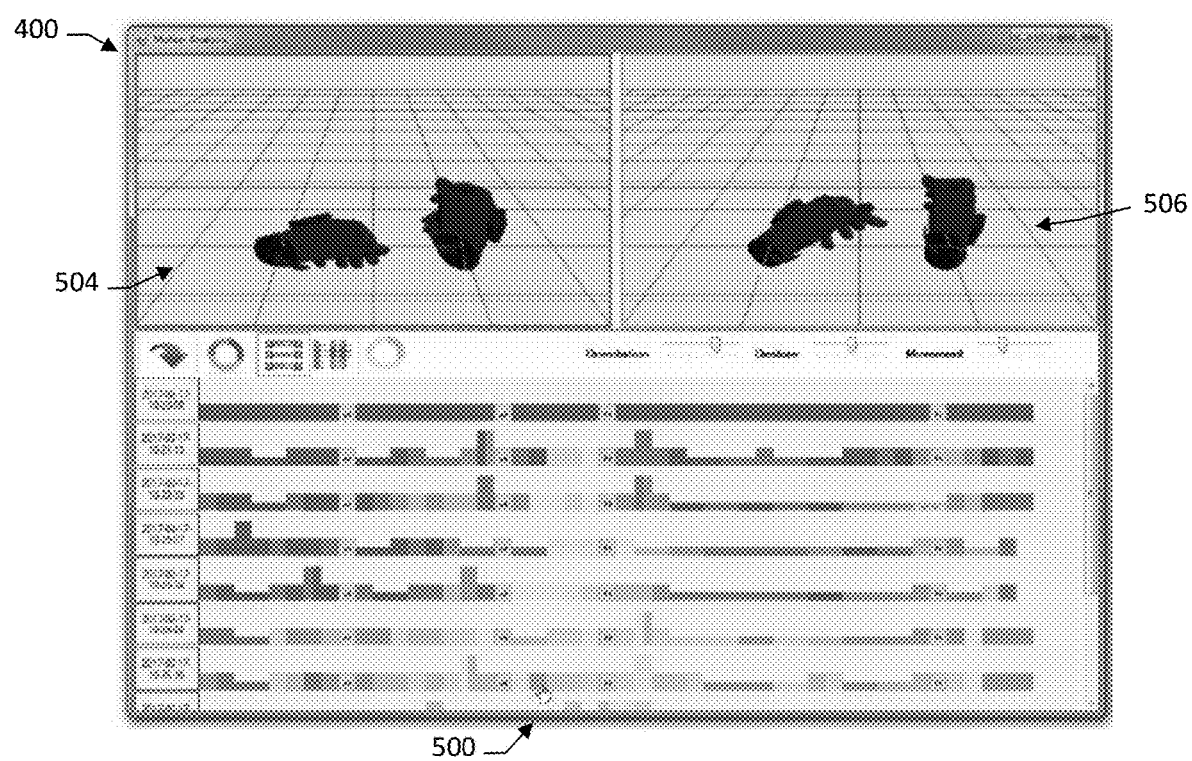
FIG. 16 is an image depicting another exemplary embodiment of a GUI of the system of FIG. 1 for comparing movement data.

In some embodiments, different visualizations are used to visually display additional information and trends for steps in a process. FIG. 15 depicts the GUI 400 with a different visualization (accessible, for example via the visualization buttons 410 of the GUI 400), in which the movements have been broken up so as to left-align the key frame labels in each movement with each other. This visualization enables a user to compare step-time-variance, i.e. changes in the time to complete a particular step, which may be useful for identifying a step that a worker is taking too long to complete, or a step that may require more or less time than previously allotted. This visualization also enables a user to extract trends from the performance of particular steps. For example, the region "A" in FIG. 15 visualizes a trend of a worker taking longer and longer to complete step 4 while exhibiting decreasing accuracy for that step over time. FIG. 16 depicts the GUI 400 with a further visualization in which the timelines of the movements have been warped with reference to the alignment computed by the processor 108 during DTW. This visualization enables a user to identify problem steps where a worker is slow or inaccurate, as well as steps where the worker is accurate and/or efficient.

In FIG. 16, the curser 500 is used to select a frame in a movement with high error, so as to identify differences in the gesture and orientation of the worker's hands as depicted in the model 504 of the reference movement and the model 506 of the selected test movement at that frame. Direct comparison of the model 504 of the reference movement and the model 506 of the selected test movement enables a user to visually identify when in a process a worker's movement deviated from the reference movement, the nature of the deviation, and the effect on the time and accuracy of the process. In other words, comparing the models 504 and 506 during a portion with a low accuracy can provide a worker with direct visual feedback that facilitates training for the process. For example, the cursor 500 in FIG. 16 is selecting a frame in a step that is visually indicated to be of low accuracy relative to the reference movement. By comparing the models 504 and 506, a user can visually determine how the motion and gesture for the process can be changed in order to correct the deviated action. In FIG. 16, the right hand in the model 506 of the test movement is depicted as rotated clockwise relative to the right hand in the model 504, and the left hand in the model 506 is tipped downwards relative to the left hand in the model 504. Thus, a user comparing the models 504 and 506 can visually determine that during this portion of the process, the left hand should be more tipped upwards, and the right hand should be more turned counter-clockwise, relative to the model 506.

In an exemplary use case for the system 100, an experienced worker records a movement for a manufacturing task, and an unexperienced worker thereafter records a performance of the same movement. The unexperienced worker then uses the system 100 to compare their performance with the movement recorded by the experienced worker in order to identify gestures, motions, orientations, and/or positions in the performance that were non-conforming and/or too slow. The unexperienced worker also uses the system 100 as a guide to learn accurate gestures, motions, orientations, and/or positions for the movement.

In another exemplary embodiment, a system according to this disclosure includes a multi-threaded data receiving and synchronization component, a gesture recovery component, a motion analysis and recognition component, and a user interface component. The user interface component includes a hand-gesture visualization interface, a machine operation interface, and a data analysis interface.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure. While several embodiments discussed above pertained to manufacturing and assembly line production, variants of the above described are also applicable to other uses such as, for example, training for recreational activities like sports, dance, etc., martial arts, medical uses such as physical therapy, and any other acceptable use.

It is claimed:

1. A method for determining a quantitative accuracy of a test movement relative to a reference movement, comprising:
   receiving, with a processor, motion capture data that includes a reference movement and a test movement;
   aligning, with the processor, the test movement with the reference movement;
   computing, with the processor, a quantitative accuracy of the test movement relative to the reference movement;
   generating, with the processor and a display output device, a visualization representative of the computed quantitative accuracy, the visualization representative of the computed quantitative accuracy including an accuracy timeline; and
   encoding the computed quantitative accuracy into the accuracy timeline to illustrate a respective computed quantitative accuracy value at each point in time of the accuracy timeline.

2. The method of claim 1, wherein:
   the reference movement is represented as a first sequence of frames that each includes motion capture data corresponding to a respective interval of time of the first sequence;
   the test movement is represented as a second sequence of frames that each includes motion capture data corresponding to a respective interval of time of the second sequence; and
   aligning the test movement with the reference movement includes mapping each frame of the second sequence for the test movement to at least one frame of the first sequence for the reference movement such that a sequence order of the mapped frames in each of the reference movement and the test movement relative to each other is preserved.

3. The method of claim 2, wherein the frames of the second sequence for the test movement are mapped to the frames of the first sequence for the reference movement via a dynamic time warping alignment process that determines a warping path to align desynchronized portions of the test movement and the reference movement.

4. The method of claim 3, further comprising:
generating, with the processor and a display output device, a visualization representative of the reference movement that includes a reference timeline formed by the frames of the first sequence;
wherein the accuracy timeline is based on the frames of the second sequence; and
wherein the processor is further configured to warp the accuracy timeline with reference to the warping path resulting from the dynamic time warping process, the warping including:
thickening and condensing portions of the accuracy timeline representative of portions of the test movement performed slower relative to corresponding portions of the reference movement, a quantitative amount for the thickening and condensing based on the relative rate between the corresponding portions; and
thinning and stretching portions of the accuracy timeline representative of portions of the test movement performed faster relative to corresponding portions of the reference movement, a quantitative amount for the thinning and stretching based on the relative rate between the corresponding portions.

5. The method of claim 1, wherein:
the motion capture data includes records describing at least one of motions, gestures, orientations, and positions performed over time for each of the test movement and the reference movement; and
the quantitative accuracy of the test movement relative to the reference movement is computed with reference to a quantitative difference in the at least one of motions, gestures, orientations, and positions over time between the test movement and the reference movement.

6. The method of claim 1, wherein the motion capture data includes a plurality of individual test movements that includes the test movement.

7. The method of claim 6, wherein:
the plurality of individual test movements are in the form of a continuous multi-movement cycle; and
the processor is further configured to split the continuous multi-movement cycle into individual test movements when aligning the test movement to the reference movement.

8. The method of claim 6, wherein the processor is further configured to:
compute a respective quantitative accuracy for each of the individual test movements relative to the reference movement; and
generate, with the display output device, a visualization representative of each of the individual test movements, wherein the computed quantitative accuracy of the test movement relative to the reference movement is encoded into the visualization representative of each of the individual test movements.

9. A system for determining a quantitative accuracy of a test movement relative to a reference movement, comprising:
a display output device;
a memory configured to store programming instructions and motion capture data including a reference movement and a test movement; and
a processor operatively connected to the display output device and the memory, and configured to execute the programming instructions to determine a quantitative accuracy of the test movement relative to the reference movement, wherein the determination of the quantitative accuracy includes:
aligning the test movement with the reference movement;
computing a quantitative accuracy of the test movement relative to the reference movement;
generating, with the display output device, a visualization representative of the computed quantitative accuracy, the visualization representative of the computed quantitative accuracy including an accuracy timeline; and
encoding the computed quantitative accuracy into the accuracy timeline to illustrate a respective computed quantitative accuracy value at each point in time of the accuracy timeline.

10. The system of claim 9, wherein:
the reference movement is represented as a first sequence of frames that each includes motion capture data corresponding to a respective interval of time of the first sequence;
the test movement is represented as a second sequence of frames that each includes motion capture data corresponding to a respective interval of time of the second sequence; and
aligning the test movement with the reference movement includes mapping each frame of the second sequence for the test movement to at least one frame of the first sequence for the reference movement such that a sequence order of the mapped frames in each of the reference movement and the test movement relative to each other is preserved.

11. The system of claim 10, wherein the processor is further configured to map frames of the second sequence for the test movement to the frames of the first sequence for the reference movement via a dynamic time warping alignment process that determines a warping path to align desynchronized portions of the test movement and the reference movement.

12. The system of claim 11, wherein:
the determination of the accuracy further includes generating, with the display output device, a visualization representative of the reference movement that includes a reference timeline formed by the frames of the first sequence;
the accuracy timeline is based on the frames of the second sequence; and
the processor is further configured to warp the accuracy timeline with reference to the warping path determined via the dynamic time warping process, the warping including:
thickening and condensing portions of the accuracy timeline representative of portions of the test movement performed slower relative to corresponding portions of the reference movement, a quantitative amount for the thickening and condensing based on the relative rate between the corresponding portions; and thinning and stretching portions of the accuracy timeline representative of portions of the test movement performed faster relative to corresponding portions of the reference movement, a quantitative amount for the thinning and stretching based on the relative rate between the corresponding portions.

13. The system of claim 9, further comprising:

a motion capture device configured to transmit motion capture data to the memory.

14. The system of claim 13, wherein the motion capture device is a pair of motion capture gloves.

* * * * *